May 7, 1940.　　　　J. LÉVAI　　　　2,199,500
CHAIN LINK BAR
Original Filed Nov. 5, 1938　　2 Sheets-Sheet 1
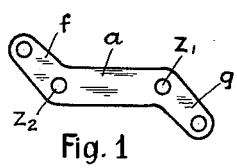
Fig. 1
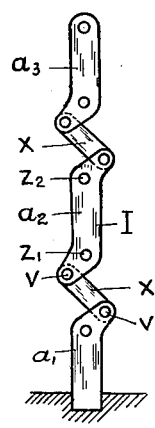
Fig. 2
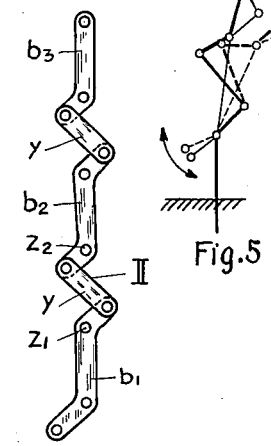
Fig. 3
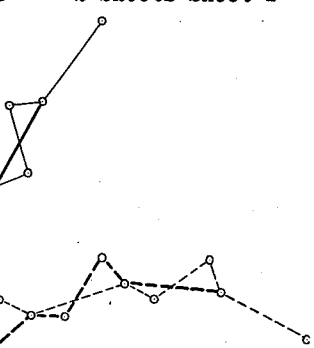
Fig. 5
Fig. 4
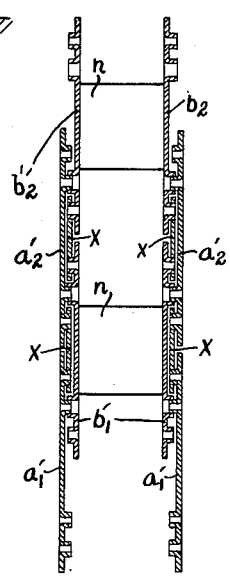
Fig. 14a
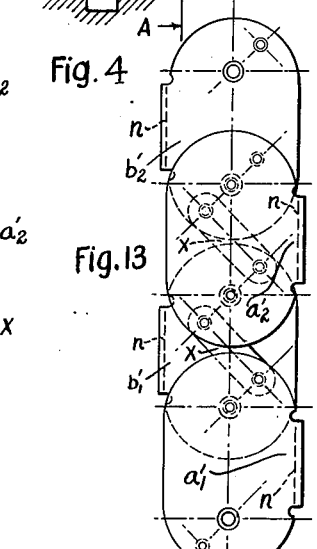
Fig. 13
INVENTOR.
JULIUS LÉVAI
BY George Benjamin
ATTORNEY.

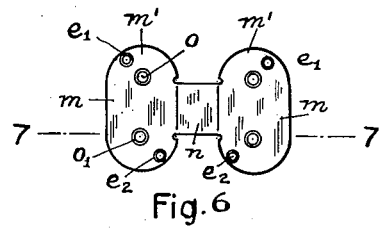
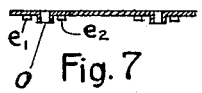
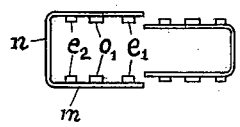
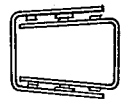
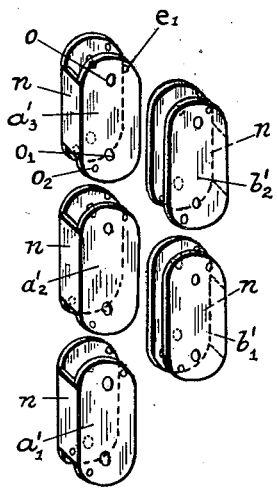
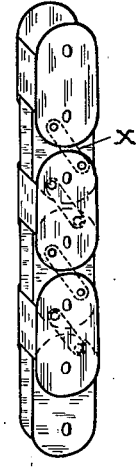

Patented May 7, 1940

2,199,500

UNITED STATES PATENT OFFICE 2,199,500

CHAIN LINK BAR

Julius Lévai, Budapest, Hungary

Original application November 5, 1938, Serial No. 239,190. Divided and this application May 6, 1939, Serial No. 272,075. In Hungary September 3, 1937

6 Claims. (Cl. 189—34)

The object of the invention is a chain link bar comprising at least three links in series arrangement and adjustable into various curved shapes.

An important feature of the invention consists in the provision of control means adapted upon any change of the relative angular adjustment of any one of said links to cause simultaneously and positively a corresponding change of the angular adjustment of the other links, whereby to any adjustment of any link a certain definite curvature of the bar is coordinated positively.

Further features and advantages of the object of the invention will become apparent from the following description in connection with the drawings in which Fig. 1 is a side elevation of a link for one form of the object of the invention;

Fig. 2 is a side elevation of a chain formed of links in accordance with Fig. 1 by means of connecting pitman rods;

Fig. 3 is a side elevation of a second such chain offset relative to the chain shown in Fig. 1;

Fig. 4 is a side elevation of a link bar composed of the chains of Figs. 2 and 3 pivoted together;

Fig. 5 is a diagram, in two different positions, of the link bar of Fig. 4, bent towards the right hand side;

Fig. 6 is a plan view of a blank for forming a link for a modification of the object of the invention;

Fig. 7 is a section on the line 7—7 of Fig. 6;

Fig. 8 shows the links bent from blanks according to Figs. 6 and 7, in axonometric representation, in the positions occupied by them before being nested;

Fig. 9 is a side elevation of a pitman rod or coupler;

Fig. 10 is a longitudinal section of Fig. 9;

Fig. 11 is a plan view of two adjacent links in accordance with Fig. 8 before assembling;

Fig. 12 is a plan view of the links of Fig. 11 during assembling;

Fig. 13 is a side view of a link bar composed of the links and pitman rods of Figs. 6 to 12;

Fig. 14 is an axonometric representation of the link bar of Fig. 13;

Fig. 14a is a diagrammatic longitudinal section on the line A—B of Fig. 13.

The link bar according to Figs. 4 and 5 is composed of the two chains or series of links $a_1$, $a_2$, $a_3$ and $b_1$, $b_2$, $b_3$ respectively (Figs. 2 and 3). Each of these series is composed of equal links according to Fig. 1, each of which has radial lever arms or crank arms $f$ and $g$, forming an angle, as required by the design, with the center line of the link. The links $a_1$, $a_2$, $a_3$ are hingedly connected by means of couplers or pitman rods $x$, whilst the links $b_1$, $b_2$, $b_3$ are similarly connected by means of similar members $y$.

Accordingly, the set of links $a_1$, $a_2$, $a_3$ on the one hand, and the set of links $b_1$, $b_2$, $b_3$ on the other hand, each form a separate chain system.

Both systems are superposed in the manner shown in Fig. 4 and are connected by pivots inserted in the holes $z_1$ and $z_2$ of the links.

By means of these pivots, the links of the two systems $a$ and $b$ are connected in such manner, that the lever arms of the connected pairs of links are situated on opposite sides of the center line of the bar. Thus the completed bar will, eventually, consist, on the one hand, of the chain $a_1$—$b_1$, $a_2$—$b_2$, $a_3$—$b_3$ . . . and, on the other hand, of the control means, consisting of lever or crank arms $f$, $g$ of the said links, and of the pitman rods or couplers $x$, $y$. On changing the relative angular positions of any two links all other links will be moved through a corresponding angle by the control gear simultaneously and positively. If the relative position of said two links is locked at any moment, the whole bar is locked thereby rigidly in the shape assumed at that moment.

Fig. 5 shows in a diagrammatic manner the position of the links in the bar bent towards the right hand side. One curved position of the bar is shown in full lines, and a more curved position in dotted lines. For the sake of clearness the links of the one group are shown in wider lines.

The system shown in Figs. 6 to 14, inclusive, is kinematically substantially identical with that of Figs. 1 to 5. However, the links are of U-shaped cross-section and have substantially semicircular continuations taking the functions of the crank arms.

The links according to Figs. 13 and 14 are formed from blanks shown in Figs. 6 and 7, and stamped from sheet iron or the like. They consist of the web $n$ and the wings $m$, which latter have semicircular continuations $m'$. Short bosses $o$, $o_1$ and $e_1$, $e_2$, respectively are stamped from the material in each wing $m$. Following this the blanks are, in accordance with Fig. 11 bent into U shapes. Pitman rods or couplers $x$, as shown in Figs. 9 and 10 are stamped from sheet iron and provided with holes $x_1$. These rods $x$ are fitted between the continuations $m'$ of the wings $m$ of the links $a'$ and $b'$, respectively, by inserting the bosses $e_1$, $e_2$ into the holes $x_1$ as shown in Fig. 14.

In Fig. 8 the two rows of links, arranged in a staggered manner relative to each other, are shown before the rows of links are nested and before the insertion of the pitman rods $x$. Following this, the rows of links $a_1'$, $a_2'$, $a_3'$ and $b_1'$, $b_2'$, $b_3'$, respectively, in which the webs are directed outwards, facing alternately to opposite sides, are nested, whereby the link bar according to Figs. 13 and 14 is formed.

The resiliency of the links enables one system to be inserted into the other one, for which purpose the wings of the links are bent resiliently in the necessary extent (Fig. 12). If the links are then released the bosses $o$, $o_1$ and $e_1$, $e_2$ overlap each other, respectively, forming pivots for the links and the pitman rods.

All links of both rows, i. e. those of even and those of odd serial number are perfectly similar, all the difference being that the links of one row are narrower so as to be adapted to be nested into the other row of links.

The links may be of equal or of unequal length, and the lengths of the lever arms and the angles formed by them with the center line of the bar may vary.

The angle of deflection is practically the same for all pairs of links in the modifications shown as comprising lever arms and pitman rods bars.

This application is a division of Serial No. 239,190, filed November 5, 1938.

What I claim is:

1. A chain link bar adjustable into various curved shapes, comprising an uninterrupted chain of links and control means adapted upon any change of the relative angular adjustment of anyone of said links to cause simultaneously and positively a corresponding change of the angular adjustment of the other links, in which bar the links are arranged in two groups, and links of each group are connected by pivots with two links of the other group and, in addition, the links of each group are connected with each other by pitman rods to form a continuous individual chain, said links having extensions beyond said pivots and said pitman rods connecting said extensions at points outside the central line of the bar passing through the centers of said pivots.

2. A bar as in claim 1, in which said extensions are provided at both ends of said links.

3. A bar as in claim 1, in which said pitman rods cross the central line of the bar.

4. A bar as claimed in claim 1, in which said links have U-shaped cross-section, facing alternately to opposite sides, and said extensions form substantially semicircular continuations of the wings of said links.

5. A bar as claimed in claim 1, in which said links have U-shaped cross-section, facing alternately to opposite sides, and said extensions form substantially semicircular continuations of the wings of said links, said pitman rods being overlapped and substantially concealed by said continuations.

6. A bar as claimed in claim 1, in which the links of both individual chains are provided integrally with hollow bosses, and the bosses of one individual chain are fitted as pivots into the bosses of the other individual chain.

JULIUS LÉVAI.